3,143,785
ELECTROLYTIC CAPACITORS
William E. R. Evans and Brian W. Kingston, London, England, assignors to International Standard Electric Corporation, New York, N.Y., a corporation of Delaware
Filed Feb. 12, 1963, Ser. No. 257,946
Claims priority, application Great Britain Feb. 22, 1962
9 Claims. (Cl. 29—25.31)

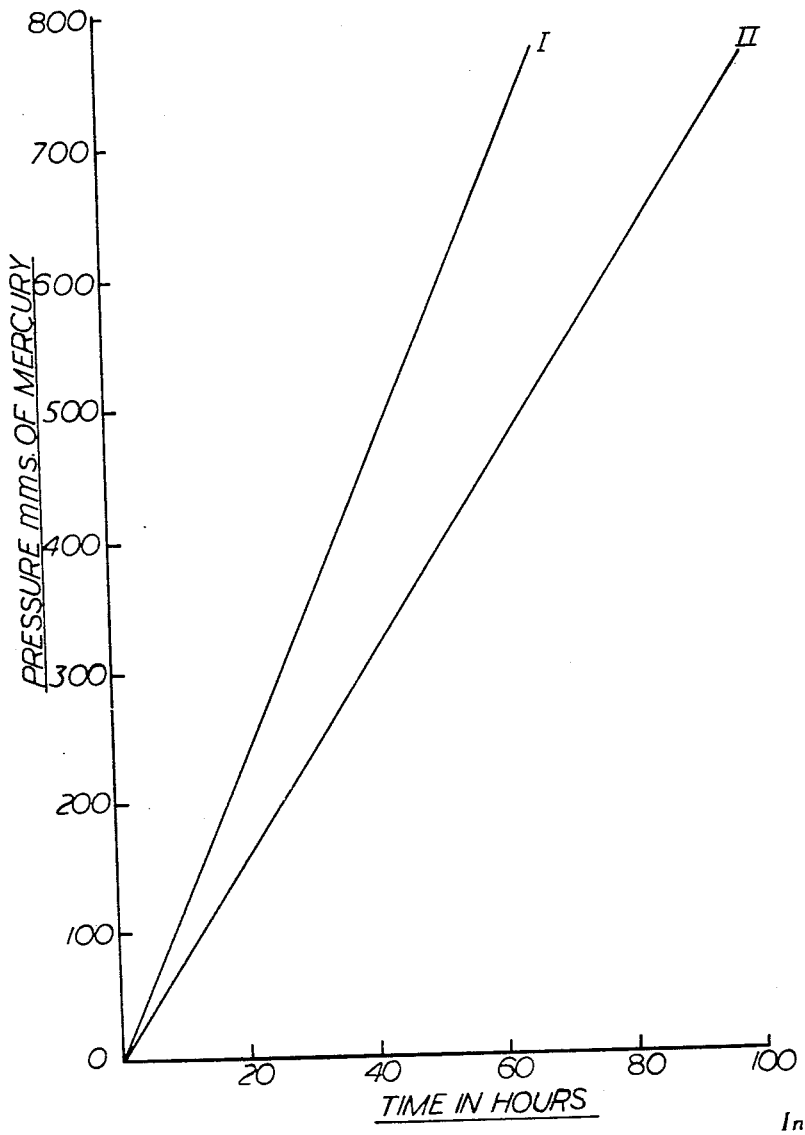

This invention relates to capacitors containing a liquid electrolyte, and more particularly to a method of sealing electrolytic capacitors during their manufacture.

One of the difficulties experienced in the manufacture of electrolytic capacitors is to provide a seal which will contain the electrolyte.

High operating temperatures will increase the tendency for electrolyte in the liquid or the vapor phase to be expelled from the container if the seal is mechanically unsound.

It has been found that seals formed by hot-thermosetting resins which are known to have good mechanical strength are sometimes rendered permeable due to the escape of bubbles and electrolyte at the elevated temperatures of the curing process, while cold-setting resins do not always bond well to the metal container, have short life, high exotherm with consequential internal stressing of cast, and in any case, lead to seals having relatively low mechanical strength at high operating temperatures.

An object of the present invention is to provide a method of sealing electrolytic capacitors with hot-thermosetting resins resulting in a reduction in the tendency to lose electrolyte both during the sealing process and during subsequent operation.

We have found that more reliable seals result from curing hot-thermosetting resins in an inert gas, the pressure of which is adjusted as the temperature of the capacitor container is increased.

Therefore, a feature of this invention is the provision of a method of sealing an electrolytic capacitor by means of a hot-thermosetting resin including the steps of carrying out the sealing process with the capacitor in an inert gas, and varying the pressure of the inert gas to correspond in a predetermined manner with the variations in a parameter of the sealing process to counteract the effect of the vapor pressure of the electrolyte on the seal during its formation by the pressure of the inert gas.

The term "inert gas" is to be taken to mean a gas which will not react with the electrolyte or with any other internal components of the capacitor.

The above-mentioned and other features and objects of this invention will become more apparent by reference to the following description taken in conjunction with the accompanying drawing in which:

FIG. 5 illustrates curves of rate of vapor pressure rise inside two different pressure vessels.

Figure 1:
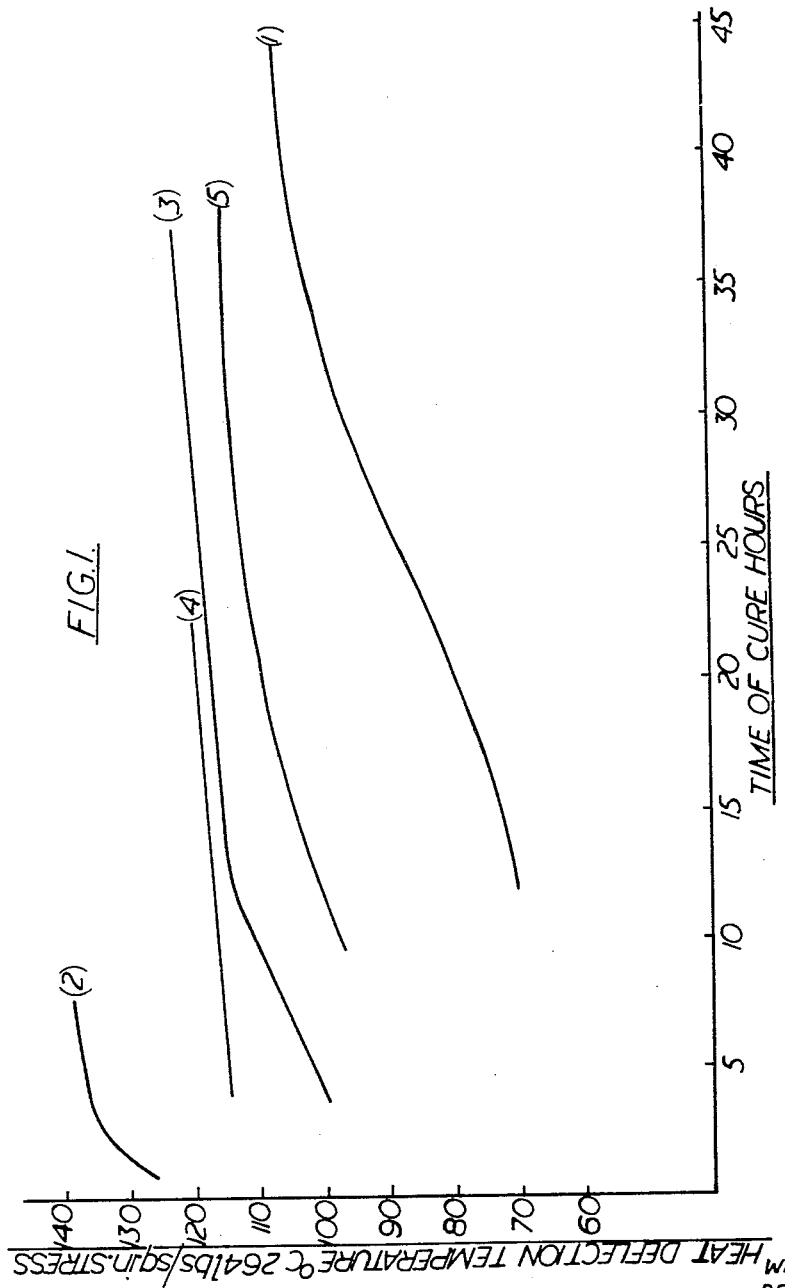
FIG. 1 illustrates curves of heat deflection temperatures for five hot-thermosetting resins.

Referring to FIG. 1, there is illustrated therein curves for five different epoxy resins of the hot-thermosetting type satisfactory for the seal of an electrolytic capacitor illustrating their mechanical strength and, hence, their ability to contain electrolytes after various curing times. Curve (1) represents the heat deflection temperatures for Shell Epikote 1040/Epikure E.P.A. cured at 100° C. (centigrade). Curve (2) represents the heat deflection temperatures for Shell Epikote 828/Epikure D.D.M., maintained at room temperature ten hours followed by gell at 80° C. for two hours followed by curing at 120° C. Curve (3) represents the heat deflection temperatures for Shell Epikote 834/Epikure N.M.A./K54 cured at 100° C., curve (4) represents the heat deflection temperature for Shell Epikote 834/Epikure N.M.A./K54 cured at 120° C., and curve (5) represents the heat deflection temperatures for Shell Epikote 1040/Epikure E.P.A. cured at 120° C. The time represented by the length of the solid curves is the length of curing time for these resins.

The superiority of the hot-thermosetting epoxy resins illustrated in FIG. 1 to the colder setting resins may be observed by comparison with the colder setting epoxy resins set forth in Table I.

Table I

| Cold-Setting Resins | Heat deflection Temperatures, 264 lb./sq. in. load |
|---|---|
| | ° C. |
| Shell Epikote 815/Epikure R.T.U | 85 |
| Shell Epikote 828/Epikure R.T.U | 115 |
| Shell Epikote 815/Epikure T | 95 |
| Shell Epikote 828/Epikure T | 64 |

Figure 2:
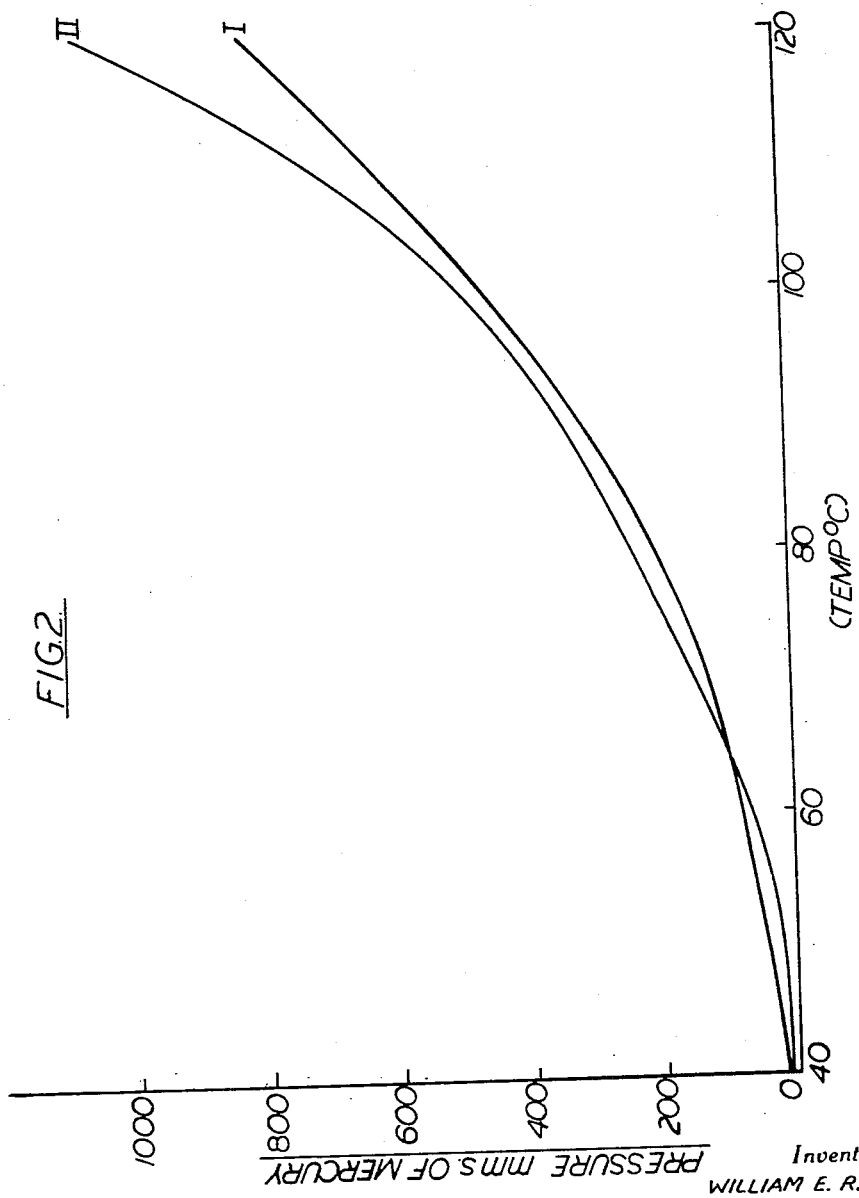
FIG. 2 illustrates curves of vapor pressure versus temperature for two electrolytes.

Referring to FIG. 2, there are illustrated therein two curves for two different electrolytes that may be used in the electrolytic capacitors sealed by the method disclosed herein illustrating the increasing vapor pressure with rise in temperature. Curve I is for Ethylene Glycol/Water/Lithium Acetate and curve II is for Ethylene Glycol/Water/Ammonium Borate.

It will be observed from the curves of FIG. 2 that if a high temperature thermosetting resin system is to be used with the seal of any electrolytic capacitors, the system, when gelling, will be subjected to pressure due to the increased vapor pressure of the electrolyte with increased temperature. Thus, in order to use high temperature thermosetting resin systems which require high temperature curing, it is necessary to balance the internal vapor pressure with an external inert gas pressure in the manner as described hereinbelow.

Figure 3:
FIG. 3 illustrates an electrolytic capacitor complete except for a seal.

Referring to FIG. 3, there is illustrated an electrolytic capacitor including a can or container 1, a lead 2 for external electrical connection, and as a hidden detail, a resilient disc 3. Disc 3 has a central hole through which lead 2 passes. Disc 3 abuts against an internal projection or necked-down portion 4 provided by previously grooving can 1. The space 5 above disc 3 is to be filled with a hot-thermosetting epoxy resin as the sealing medium, such as identified hereinabove with respect to FIG. 1.

Figure 4:
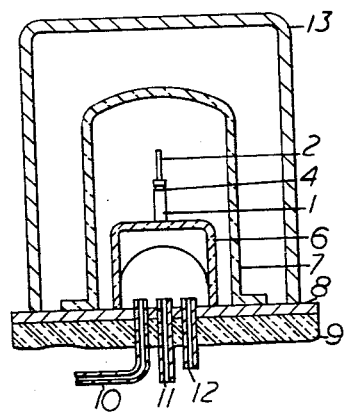
FIG. 4 illustrates apparatus that may be employed to seal a capacitor.

Referring to FIG. 4, there is illustrated capacitor 1 standing with lead 2 uppermost on a table 6 within an inverted jar or pressure vessel 7. Table 6 and jar 7 made of dielectric heat resistant material are supported on a metallic base plate 8 having secured to the underside thereof a layer 9 of thermally insulating material. Suitable material for these components are table 6—ceramic, jar 7—Pyrex, plate 8—brass, and layer 9—asbestos. Through holes in base plate 8 and layer 9 pass a conduit 10 coupled to a source of dry nitrogen via a pressure control valve (not shown), a conduit 11 coupled to the atmosphere via a pressure release valve (not shown) and a conduit 12 coupled to a pressure gauge (not shown).

The contiguous surfaces of jar 7 and base plate 8 are smooth and greased, and these, together with conduits 10, 11 and 12, the nitrogen source, and the pressure valves and gauge constitute a system for maintaining in jar 7 an atmosphere of dry nitrogen, the pressure of which can be set to any desired valve between one atmosphere and the pressure of the source.

To make the seal, the space shown at 5 in the capacitor shown in FIG. 1 is filled with a hot-thermosetting resin, and the capacitor is placed under inverted jar 7 as shown in FIG. 2. A stove 13 equipped with thermostatically-controlled heating means (not shown) is placed to surround jar 7 and is switched on in order to bring capacitor 1 to the curing temperature of the epoxy resin, such as specified hereinabove with respect to FIG. 1. While the stove is being heated, dry nitrogen is fed to the inverted jar 7, and the pressure controls are manipulated to vary the nitrogen pressure with time according to a predetermined schedule which will be explained hereinbelow. The thermostatic control of the stove 13 is operative to maintain the stove at the curing temperature once it is attained. The stove is kept at this temperature for a period depending on the resin, such as illustrated in FIG. 1. After this period, the seal is ready for use, and the capacitor is allowed to cool.

The vapor pressure of an electrolyte within a capacitor inside a pressure vessel or jar 7 will depend on the temperature of the capacitor which, in turn, depends upon the heating rate of the vessel and the heat transfer characteristic of this vessel. These properties of the pressure vessel are peculiar to the particular vessel in use and the illustration of the curves in FIG. 5 demonstrates the rate of vapor pressure rise inside two different pressure vessels. Curve I is for a 10 inch domestic pressure cooker, while curve II is for a commercial reaction pressure vessel 10 inches in diameter x 2 feet high with a removable tray assembly. These curves were obtained in the following manner.

A beaker of the same electrolyte as used in capacitor 1 is introduced under the inverted jar in place of the capacitor 1 as shown in FIG. 4. The pressure valves in conduits 10 and 11 are shut, but the pressure gauge remains coupled. The stove 13 is placed in position and switched on. As the stove and its contents heat up, the pressure within the jar will increase due to the increasing vapor pressure of the electrolyte until it flattens off at the curing temperature of the preferred resin, at which temperature, it will be recalled, the thermostatic control causes the stove to stabilize. The pressure gauge reading is recorded continually against time, and a corresponding curve is plotted.

It is, of course, possible to obtain the illustration of the curves of FIG. 5 for the particular vessel involved by measurement of the temperature rise in the vessel and from this information deducing the vapor pressure rise from FIG. 2. When these curves of FIG. 5 were obtained the selected pressure vessel was placed cold in an air-circulated oven stabilized at 140° C., thus, obtaining standard rate of temperature rise condition.

The curve obtained as described above is used in the resin curing process to determine the schedule according to which the dry nitrogen pressure within jar 7 is varied with time. The schedule consists in continually adjusting the nitrogen pressure to be 1.5 lb./square inch in excess of the values taken from the graph for corresponding times after starting the heating process until the seal is cured. During the time that the temperature is constant (at the curing temperature), the pressure valves are set to maintain the corresponding pressure, which will, of course, also be constant.

In this manner, the pressure within jar 7 is controlled in such manner that the force on the seal due to the vapor pressure of the electrolyte is counteracted by the pressure of the dry nitrogen.

As already mention, epoxy resins cured at high temperatures have been found to be more satisfactory sealing substances for liquid electrolyte capacitors than any other class of materials. The resins described herein have been found particularly satisfactory for capacitors designed to work up to around the curing temperature of the resins in electrical circuits. Other hot-thermosetting resins have been found to give good results, however, and so the principles of the invention may be applied to other designs of capacitor using for the seal other epoxy resins falling into the hot-thermosetting class.

The preferred resins, and other resins may be cured according to other heating procedures, and the pressure of the inert gas may be controlled by means of adjusting other parameters than pressure against time. It is essential, however, that an inert gas atmosphere be used, and that its pressure should be continually adjusted to provide a force on the seal to counteract the vapor pressure of the electrolyte until the seal is completely cured. The schedule described has the advantage of automatically compensating for instrumental errors, and heat gradients, etc.

Care should be taken not to use too much pressure outside the capacitor for given vapor pressures inside it until the seal is cured, otherwise the inert gas will bubble into the capacitor through the seal with the risk that the resulting seal will be porous.

Disc 3, shown as hidden detail in FIG. 3, is not essential to the carrying out of the invention, but insofar as it is in contact with the lead 2 and the can, and moreover abuts against the annular projection 4 formed by grooving can 1, it enables space 5 to contain the epoxy resin before curing.

While we have described above the principles of our invention in connection with specific apparatus, it is to be clearly understood that this description is made only by way of example and not as a limitation to the scope of our invention as set forth in the objects thereof and in the accompanying claims.

We claim:
1. A method of sealing an electrolytic capacitor by means of a hot-thermosetting resin including the steps of:
   injecting an inert gas into the region where the sealing process is carried out; and
   varying the pressure of said inert gas to correspond in a predetermined manner with the variations in a parameter of said sealing process to counteract the effect of the vapor pressure of said electrolyte on said resin during said sealing process.
2. A method of sealing an electrolytic capacitor by means of a hot-thermosetting resin including the steps of:
   injecting an inert gas into the region where the sealing process is carried out; and
   varying the pressure of said inert gas to correspond in a predetermined manner with the variations in the temperature of said sealing process to counteract the effect of the vapor pressure of said electrolyte on said resin during said sealing process.
3. A method of sealing an electrolytic capacitor comprising the steps of:
   placing the capacitor and a hot-thermosetting resin in a sealing relation therewith in an inert atmosphere;
   heating said capacitor and said resin to the curing temperature of said resin; and
   varying the pressure of said inert atmosphere to counteract the vapor pressure of said electrolyte on said resin during said heating step.
4. A method of sealing an electrolytic capacitor by means of a hot-thermosetting resin including the steps of:
   placing said capacitor and said resin in a sealing relation with said capacitor in a hermetically sealed region;
   injecting an inert gas into said region;
   heating said region to the curing temperature of said resin; and
   varying the pressure of said inert gas during said heating step to counteract the effect of the vapor pressure of said electrolyte on said resin during the heating step.

5. A method of sealing an electrolytic capacitor by means of a hot-thermosetting resin including the steps of:
providing a container having an open end;
filling said container with an electrolyte;
placing said resin in said open end;
placing said container containing said electrolyte and said resin in a hermetically sealed region;
injecting an inert gas into said region;
heating said region to the curing temperature of said resin; and
varying the pressure of said inert gas during said heating step to counteract the effect of the vapor pressure of said electrolyte on said resin during the heating step.

6. A method of sealing an electrolytic capacitor by means of a hot-thermosetting resin including the steps of:
placing said capacitor and said resin in a sealing relation with said capacitor in a hermetically sealed region;
injecting an inert gas into said region;
heating said region from a given temperature to the curing temperature of said resin over a predetermined period of time; and
varying the pressure of said inert gas with time during said heating step to counteract the effect of the vapor pressure of said electrolyte by said resin during the heating step.

7. A method of sealing an electrolytic capacitor by means of a hot-thermosetting resin including the steps of:
providing a container having an open end;
filling said container with an electrolyte;
placing said resin in said open end;
placing said container containing said electrolyte and said resin in a hermetically sealed region;
injecting an inert gas into said region;
heating said region from a given temperature to the curing temperature of said resin over a predetermined period of time; and
varying the pressure of said inert gas with time during said heating step to counteract the effect of the vapor pressure of said electrolyte on said resin during the heating step.

8. A method of sealing an electrolytic capacitor by means of a hot-thermosetting resin including the steps of:
providing a cylindrical container having an open end and containing a necked-down portion spaced from said open end a predetermined distance;
filling said container with an electrolyte;
placing a disc in said open end to seat on said necked-down portion, said disc carrying one of the capacitor leads;
placing said resin in said open end in a sealing relation with said disc, said container and said lead;
placing said container containing said electrolyte and said resin in a hermetically sealed region;
injecting an inert gas into said region;
heating said region from a given temperature to the curing temperature of said resin over a predetermined period of time;
maintaining said curing temperature for a predetermined length of time;
varying the pressure of said inert gas with time during said heating step to counteract the effect of the vapor pressure of said electrolyte on said resin during the heating step; and
maintaining the pressure of said inert gas during the curing period to counteract the vapor pressure of said electrolyte on said resin during the curing period.

9. A method of sealing an electrolytic capacitor by means of a hot-thermosetting resin including the steps of:
determining the vapor pressure versus time characteristic of the electrolyte to be employed in said capacitor for an increasing temperature to the curing temperature of the particular resin being employed to seal said capacitor;
placing the container of said capacitor including said electrolyte and said resin in a sealing relation with the container of said capacitor in a hermetically sealed region;
injecting an inert gas into said region;
heating said region to the curing temperature of said resin;
maintaining the pressure of said inert gas at a predetermined pressure in excess of the vapor pressure of said electrolyte; and
varying the pressure of said inert gas in accordance with the determined vapor pressure versus time characteristic of said electrolyte to counteract the effect of the vapor pressure of said electrolyte on said resin during the heating step.

No references cited.